US006578970B2

(12) United States Patent
Paquette

(10) Patent No.: US 6,578,970 B2
(45) Date of Patent: Jun. 17, 2003

(54) POINT-LIKE LAMP WITH ANODE CHIMNEY

(75) Inventor: Raymond E. Paquette, Santa Clara, CA (US)

(73) Assignee: Advanced Radiation Corporation, Santa Clara, CA (US)

( * ) Notice: Subject to any disclaimer, the term of this patent is extended or adjusted under 35 U.S.C. 154(b) by 115 days.

(21) Appl. No.: 09/957,480

(22) Filed: Sep. 19, 2001

(65) Prior Publication Data

US 2003/0052607 A1 Mar. 20, 2003

(51) Int. Cl.[7] ........................ G03B 21/28; G03B 21/20; G03B 21/16; H04N 5/74; H01J 17/04

(52) U.S. Cl. ............................ 353/99; 353/31; 353/34; 353/37; 353/122; 353/61; 353/85; 313/570; 313/620; 313/631; 313/632; 348/771

(58) Field of Search ................................ 313/570, 620, 313/631, 632; 353/99, 31, 122, 34, 37, 61, 85; 348/771

(56) References Cited

U.S. PATENT DOCUMENTS 5,479,065 A * 12/1995 Sugimoto et al. ........... 313/113
6,109,995 A 8/2000 Altmann et al. .............. 445/49
6,215,247 B1 4/2001 Kurano et al. .............. 313/631
6,232,720 B1 5/2001 Kitahara et al. ............ 313/634
6,356,700 B1 * 3/2002 Strobl ........................ 385/147
6,494,581 B2 * 12/2002 Shimizu ...................... 353/61
2001/0038265 A1 * 11/2001 Nishida ...................... 313/631
2001/0040806 A1 * 11/2001 Okazaki ..................... 362/296
2002/0074943 A1 * 6/2002 Mehr et al. ................. 313/631

OTHER PUBLICATIONS

"Video Processing for DLP™ Display Systems" V. Markandey, T. Clatanoff, G. Pettitt Digital Vido Products, Texas Instruments, Inc.

"DLP and Digital Display Interfaces: The Complete Digital Solution"—M. Pyne; L. Yoder Texas Instruments, Jun. 10, 1999.

* cited by examiner

*Primary Examiner*—Russell Adams
*Assistant Examiner*—Melissa J Koval
(74) *Attorney, Agent, or Firm*—Thomas E. Schatzel; Law Offices of Thomas E. Achatzel

(57) ABSTRACT

A high-intensity arc lamp comprises a glass envelope with a pressurized gas atmosphere. A cathode and an anode structure are disposed within. A pointed tip of the cathode is juxtaposed by a central hole in a face of the anode and a small gap between them. Such central hole is vented away from the arc down inside the anode structure. During operation, heat from the arc at the entrance to the central hole drives a wind of xenon gas down through such vents in the anode structure.

10 Claims, 3 Drawing Sheets

POINT-LIKE LAMP WITH ANODE CHIMNEY

BACKGROUND OF THE INVENTION

1. Field of the Invention

The present invention relates generally to electric arc lamps, and more specifically to pressurized gas types that can operate at power levels in excess of a kilowatt and have a very small, stable point of radiation.

2. Description of the Prior Art

Texas Instruments (Austin, Tex.) introduced the digital micromirror device (DMD) in 1987. The DMD is a micro-electro-mechanical systems (MEMS) that digitally controls thousands of tiny mirrors in an array on a semiconductor chip. The MEMS structure is fabricated by complementary metal oxide semiconductor (CMOS) technology processes over a CMOS memory. Each light switch has an aluminum mirror that reflects light in one of two directions, depending on the electronic state of the underlying memory cell. Video images can be projected by shining a powerful light on the DMD and electronically tilting individual mirrors to form whole images on the array. Bursts of digital light pulses with various durations are interpreted by the eye as shades of gray. Color filters are used in combination to create full-color projected images.

Digital light projection (DLP) systems include image processing, memory, a light source, and optics. A typical DLP system is capable of projecting large, bright, seamless, high-contrast color image with better color fidelity and consistency than traditional types of displays.

When a DMD memory cell is in the 1-state, the mirror rotates to its +10 degree position (relative to zenith). In the 0-state, the mirror rotates to its −10 degree position. In the DMD, a suitable light source and projection optics are arranged so the mirror can reflect incident light either in or away from the pupil of a projection lens. Typically, the 1-state of the mirror produces a pixel that appears bright on the screen, and the 0-state of the mirror appears dark. Gray scale is achieved by binary pulse-width modulation, e.g., tilting the mirror to the 1-state for different time durations according to the brightness shade needed. Color pixels can be generated by using stationary or rotating color filters, in combination with one, two, or three DMD chips.

The DMD light switch is a MEMS structure consisting of a mirror that is rigidly connected to an underlying yoke. The yoke in turn is connected by two thin, mechanically compliant torsion hinges to support posts that are attached to the underlying substrate. Electrostatic fields developed between the underlying memory cell and the yoke and mirror cause rotation in the positive or negative rotation direction. The rotation is limited by mechanical stops to +10 or −10 degrees. The fabrication of the DMD superstructure begins with a completed CMOS memory circuit. Through the use of six photomask layers, the superstructure is formed with alternating layers of aluminum for the address electrode, hinge, yoke, and mirror layers and hardened photoresist for the sacrificial layers that form the two air gaps. The aluminum is sputter-deposited and plasma-etched. The sacrificial layers are plasma-ashed to form the air gaps.

Texas Instruments is actively pursuing two broad business opportunities for DLP, projection displays and continuous-tone color printing. Projection displays are needed for large audiences, portable business uses, and consumer/home appliances.

Digital display engines (DDE's) are now being marketed that include a DLP subsystem ready for integration with a video interface, a power supply, a sound sub-system, controls, and a cabinet Texas Instruments is manufacturing DDE's for business projectors with VGA resolution (640×480). SXGA resolution (1280×1024) have also been demonstrated.

Unfortunately, the prior art in high-intensity lamps lack the particular kind of light source needed for good DPL systems. The arc needs to be short and very stable. But in conventional lamps, the arcs are relatively long and jitter. This makes less than all the light produced available to the DMD and the image on the display screen.

Prior art attempts at very-short arc lamps with solid cathodes and anodes have resulted in the two expanding and colliding under the heat of operation.

SUMMARY OF THE PRESENT INVENTION

It is therefore an object of the present invention to provide a high intensity lamp suitable for DLP systems.

It is another object of the present invention to provide an arc lamp with a small, stable arc during operation.

It is a further object of the present invention to provide an arc lamp that pumps its internal pressurized atmosphere through the arc and out vents in its anode structure.

Briefly, a high-intensity arc lamp embodiment of the present invention comprises a glass envelope with a pressurized gas atmosphere. A cathode and an anode structure are disposed within. A pointed tip of the cathode is juxtaposed by a central hole in a face of the anode and a gap between them is on the order of 0.050 inches. Such central hole is vented away from the arc down inside the anode structure. Furthermore, the central vent hole prevents a physical-contact collision between the anode and cathode during the heat of operation. During operation, heat from the arc at the entrance to the central hole drives a wind of xenon gas down through such vents in the anode structure.

An advantage of the present invention is that an arc lamp is provided that can operate at kilowatt power levels and has a long operational life.

Another advantage of the present invention is that a light source is provided which is suitable for DLP systems.

A further advantage of the present invention is that an arc lamp is provided with a very small point of light source that is also very stable during operation.

These and other objects and advantages of the present invention will no doubt become obvious to those of ordinary skill in the art after having read the following detailed description of the preferred embodiments which are illustrated in the various drawing figures.

IN THE DRAWINGS

DETAILED DESCRIPTION OF THE PREFERRED EMBODIMENT

Figure 1:
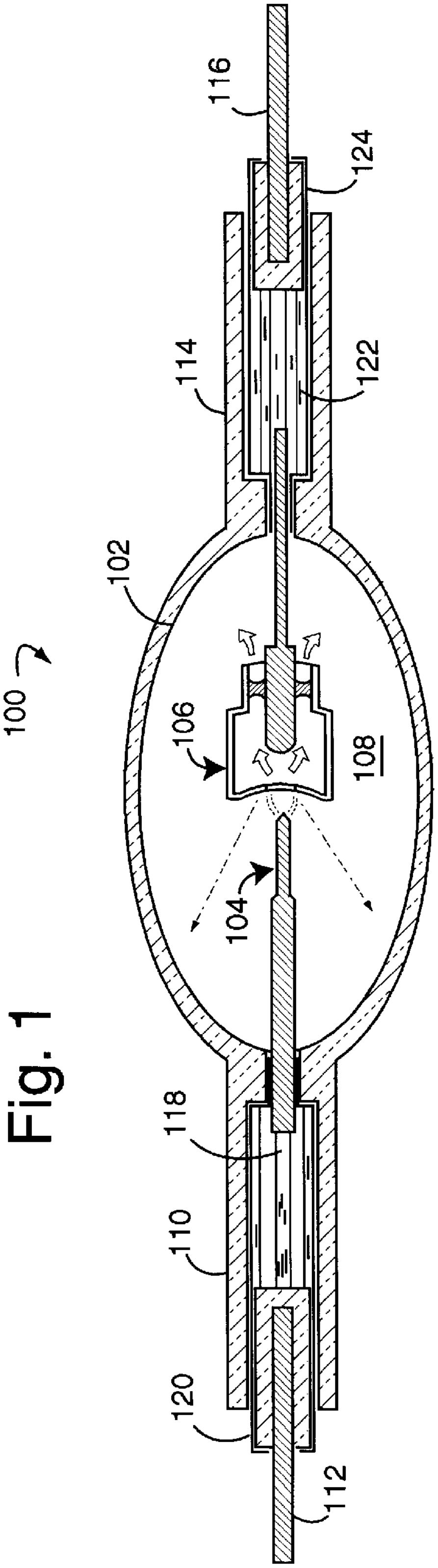
FIG. 1 is a cross-sectional diagram of an improved very-short arc lamp embodiment of the present invention.

FIG. 1 illustrates a xenon arc lamp embodiment of the present invention, referred to herein by the general reference numeral 100. The arc lamp 100 comprises a quartz glass envelope 102, a cathode 104, an anode 106, and a pressurized xenon atmosphere 108. A cathode stem 110 is supported by a metal rod 112 in a lamp holder, as is an anode stem 114 by another metal rod 116. The electrical connection to the cathode 104 is made by a number of metal foils 118 to a cathode connection ring 120. Similarly, the electrical connection to the anode 106 is made by a number of metal foils 122 to an anode connection ring 124.

Figure 2:
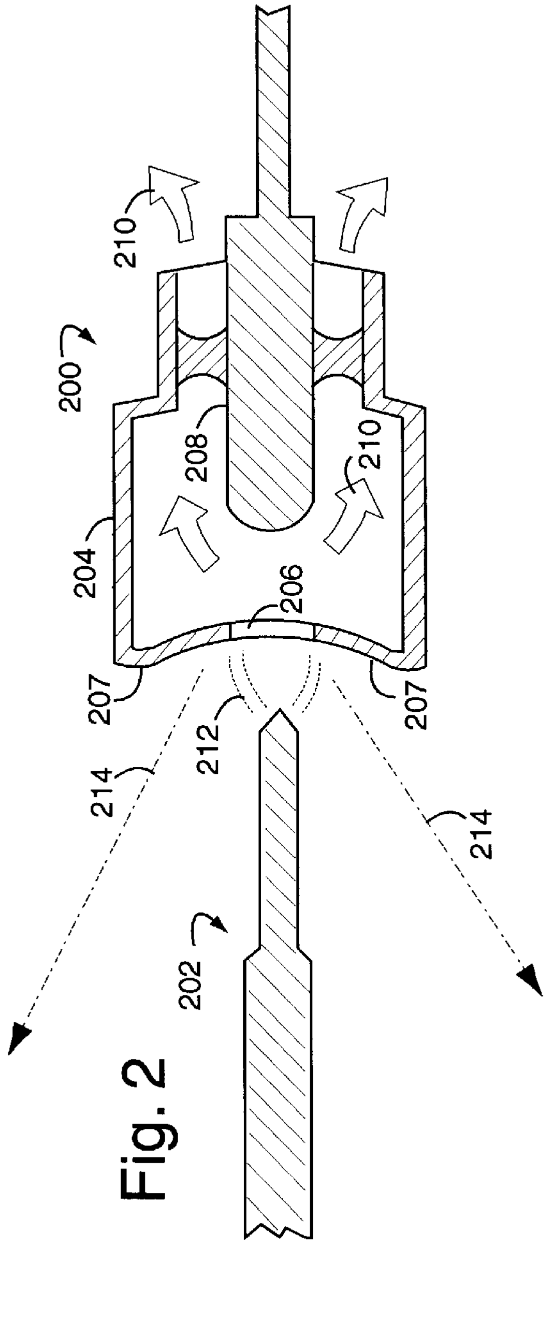
FIG. 2 is a cross-sectional diagram of a cathode and anode assembly embodiment of the present invention similar to that shown in FIG. 1.

FIG. 2 illustrates an arc lamp anode assembly 200 which is like anode 106 shown in FIG. 1. The arc lamp electrode assembly 200 faces a cathode 202 and includes a head 204 with a central vent hole 206 in its cathode-facing surface 207. The head 204 is supported by and electrically connected to an anode stem 208. In a typical embodiment, the cathode 202 is thoriated tungsten 2%, the anode head 204 is pure tungsten, and the remaining metal parts are made of molybdenum.

During operation, a wind 210 develops as a convection current of xenon gas is blown away from the central vent hole 206 by a plasma arc 212. The sharp tip of cathode 202 is placed unusually close to the anode's cathode-facing surface 207, and the plasma arc 212 actually develops as a small point-like arc immediately in front of the ring of the central hole 206. As the lamp heats from a cold start, the distance the plasma arc 212 jumps between the cathode and anode decreases. This is due to axial thermal expansion of the cathode and the anode structure. In a prototype that was tested, the arc spacing was about 0.050 inches cold, decreasing to about 0.040 inches when the lamp was hot.

The wind 210 assists in preventing the plasma arc 212 from shorting out, and preventing destructive holes from being burned through in the tungsten of the cathode and/or anode. Such vent hole placement and resulting gas circulation also improves heat distribution throughout the anode.

Experiments on prototype devices have demonstrated a stable plasma arc 212 that produces a very small but brilliant point of light. The arc ran at 16.5 volts and drew eighty amps direct current (DC). The small, stable arc characteristics make embodiments of the present invention very good choices in digital light projection (DLP) applications. Such prototypes had holes about 0.125 inches and three exit vents about 0.075 inches in diameter. The anode head 204 had an outside diameter of about 0.625 inches. In a first prototype lamp that was tested, the anode's cathode-facing surface 207 was convex and bullet-nosed. Such will be appropriate in some applications.

All embodiments of the present invention include the sharp tip cathode 202 placed very close to a central hole 206 in an anode, and all pump the chimney-like wind 210 out through vents in the stem end of the anode head 204. However, some embodiments of the present invention further include a mirror finish on the anode's cathode-facing surface 207.

The cathode-facing surface 207 in FIG. 2 is shown having a concave cross section that acts as a mirror lens. Tests have shown that the mirror-like surface does not tarnish or blacken during many hours of operation, and can be depended upon to help collect light from the plasma arc 212 and direct it out in light rays 214. Further, external reflectors can be added to direct all the radiated light into an optics system or on to a DMD in a DLP system.

Figure 3:
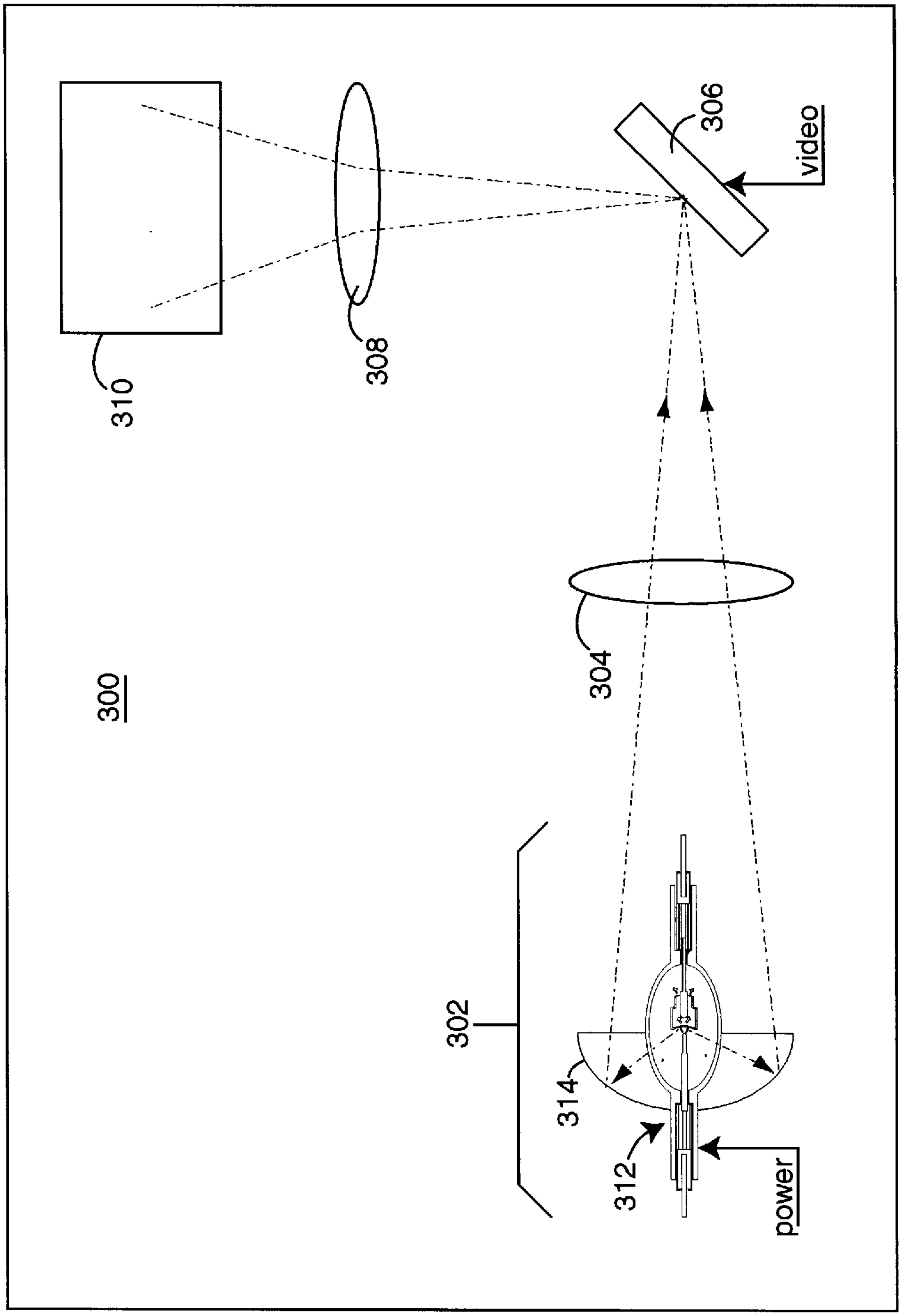
FIG. 3 is a schematic diagram of a digital light projection embodiment of the present invention that depends on a lamp like that shown in FIGS. 1 and 2.

FIG. 3 represents a digital light projection (DLP) system, and is referred to herein by the general reference numeral 300. The DLP system 300 comprises a light source 302, a first optics system 304, a digital micromirror device (DMD) 306, a projection output optics system 308, and a display screen 310. Systems for color video may further include multiple DMD's and color filters. The light source critically includes a point-like arc lamp 312 like those shown in FIGS. 1 and 2, and a mirror reflector 314 for collecting the lamp's light output and bringing it to a focus. The mirror reflector 314 is preferably a parabolic or elliptical type that has been electroformed from rhodium and nickel on a mandrel.

During operation, a kilowatt or more of electrical power is input to the lamp 312. A digital video signal is applied to the DMD 306. An image represented by the video will appear on the display 310. The typical power input to lamp 312 is 16–18 volts at 60–80 amps DC. The DMD 306 may be implemented with good results with commercial devices marketed by Texas Instruments (Austin, Tex.).

Lamp embodiments of the present invention do not necessarily depend on xenon atmospheres, other rare gases can be used such as argon, krypton, etc. A mercury vapor lamp constructed as described herein will also benefit from the unique anode illustrated. However xenon produces a white light at 5500° Kelvin, which is a close match for natural sunlight which is very desirable in DLP applications.

Figure 4:
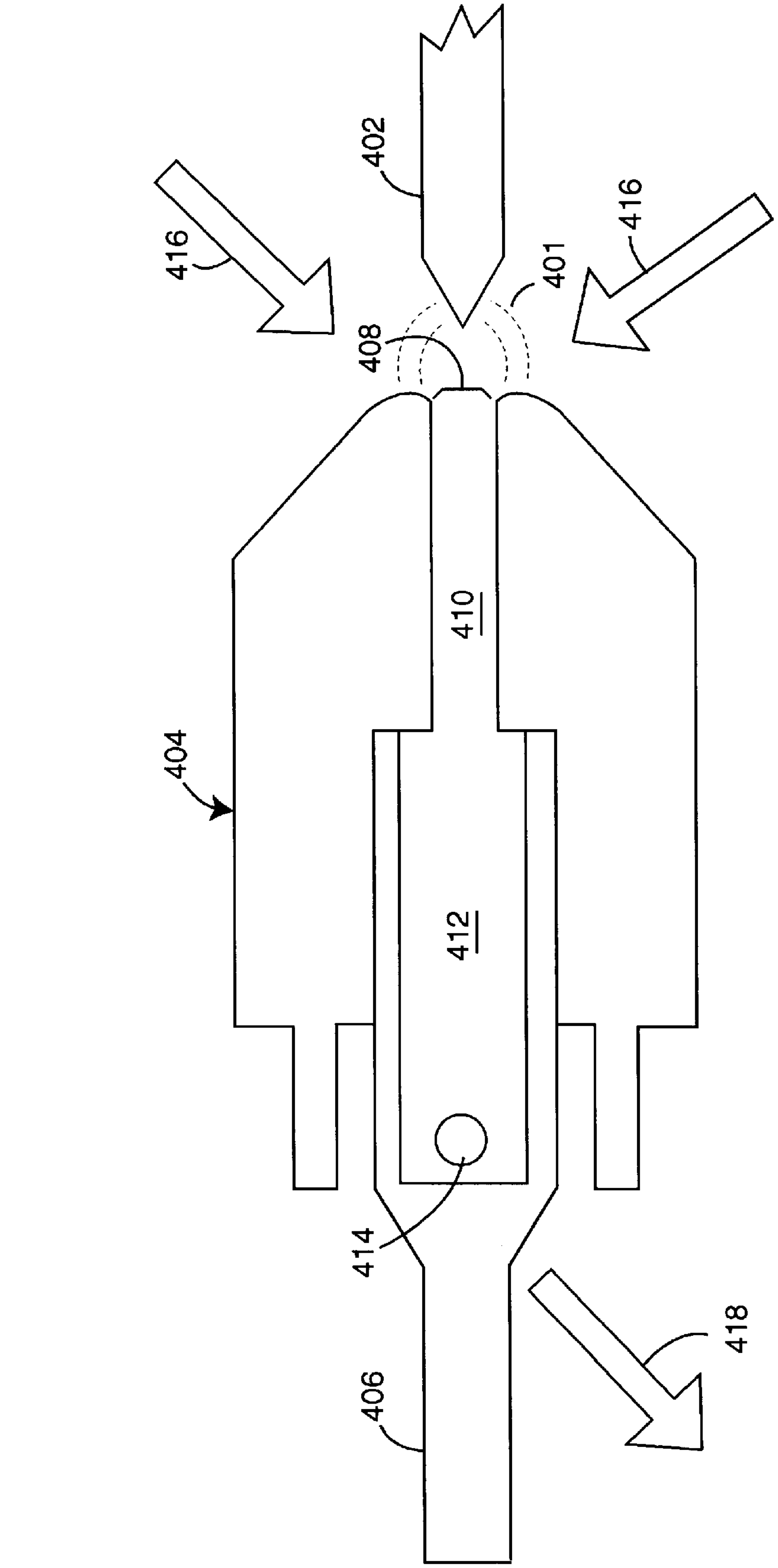
FIG. 4 represents an arc-lamp electrode assembly embodiment of the present invention.

FIG. 4 represents an arc-lamp electrode assembly embodiment of the present invention, and is referred to herein by the general reference numeral 400. Such electrode assembly 400 is a substitute for those shown in FIGS. 1–3. The electrode assembly 400 also produces a point-like arc 401 between a cathode 402 and an anode 404. A stem 406 supports the whole of anode 404. A cathode-facing hole 408 is provided for entry of a stabilizing gas flow. Such travels axially down a central shaft 410 and radially out a number of exhaust manifolds 412 and exhaust ports 414.

Arrows 416 represent the gas flow which enters cathode-facing hole 408 after first passing through the arc 401. Differences in heating of the envelope gases generate such circulation, e.g. like in a chimney. Arrow 418 represents the exiting flows of gases returning to the main pool of pressurized inert gas inside the lamp's envelope.

The anode 404 differs from those shown in FIGS. 1–3 by its bull-nose contour. Light gathering from the point-like arc 401 may be totally left to an external reflector system. The mass of material around the central shaft is preferably comprised of pure tungsten, and thick enough to prevent liquid puddles of metal to form on the face due to excessive thermal resistance.

The gap bridged by the point-like arc 401 is preferably on the order of 0.050 to 0.040 inches, cold to hot. The flow of gases into the central shaft 410 through the arc help stabilize the arc. The placement of hole 408 relative to the tip of cathode 401 provides for reduced gap changes between cold-start and hot operation.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An improved high-intensity electric arc lamp with a glass envelope containing a gas atmosphere, a cathode, and an anode, the improvements comprising:

a central vent hole disposed in an anode head, and juxtaposed to a sharp tip end of a cathode; and a vent internal to the anode head and providing for a leading away of heated gases from an arc area immediately in front of said central vent hole.

2. The improved lamp of claim 1, wherein:

the central vent hole prevents a physical contact and collision of the cathode and anode that would otherwise occur during thermal expansion caused by the heat of operation.

3. The improved lamp of claim 1, wherein:

the central vent hole and said sharp tip end of a cathode are separated by about 0.050 inches at a cold start and close to about 0.040 inches when heated.

4. The improved lamp of claim 1, comprising the further improvements of:

a convex dish surface disposed in a cathode-facing surface of the anode head and immediately surrounding said central vent hole;

wherein, during operation a point-like arc forms in said arc area and light produced is reflected to an external focus.

5. The improved lamp of claim 1, wherein:

the vent and central vent hole provide for a one-way flow of gases through said arc area to stabilize an electric arc during operation.

6. A method of operating an arc lamp with a short arc length, the method comprising the steps of:

forming a hole in an anode at a point that faces a pointed tip of a cathode; and venting said hole away to promote a circulation of gases contained within a glass envelope.

7. The method of claim 6, further comprising the step of:

fixing the separation distance between said anode and said cathode to be in the range of 0.040–0.050 inches.

8. A method of operating an arc lamp with an arc length of about 0.050 to 0.040 inches, the method comprising the steps of:

forming a hole in an anode at a point that faces a pointed tip of a cathode;

venting said hole away to promote a circulation of gases contained within a glass envelope; and surrounding said hole with a convex dished reflector disposed in a cathode-facing surface of said anode.

9. The method of claim 8, wherein the step of surrounding is such that light from a small point-like arc in front of said hole is gathered and reflected out to a parabolic reflector and on to a focus.

10. A digital light projection (DLP) system, comprising:

an arc lamp including:

a central vent hole disposed in an anode head, and juxtaposed to a sharp tip end of a cathode; and a vent internal to the anode head and providing for a leading away of heated gases from an arc area immediately in front of said central vent hole;

a first optics system for focusing light from said arc area to a first focus;

a digital micromirror device (DMD) located at said first focus and having a video input and a reflected-light image output; and a second optics system for receiving said reflected-light image output from the DMD and for projecting it on to a second focus and image display screen.

* * * * *